United States Patent [19]
Jandal et al.

[11] Patent Number: 5,850,848
[45] Date of Patent: Dec. 22, 1998

[54] FLOAT VALVE

[75] Inventors: Daoud A. Jandal, La Crosse; Jeffrey S. Seewald, Onalaska, both of Wis.; Ralph C. Mullally; William J. Plzak, both of La Crescent, Minn.

[73] Assignee: Gas Research Institute, Chicago, Ill.

[21] Appl. No.: 490,595

[22] Filed: Jun. 15, 1995

[51] Int. Cl.$^6$ .............................. F16K 31/20; F16K 33/00
[52] U.S. Cl. ...................... 137/422; 137/430; 137/625.3; 251/77
[58] Field of Search ................................ 137/420, 422, 137/429, 430, 433, 625.3, 625.33, 192, 202, 442, 443, 444; 251/77, 84, 86

[56] References Cited

U.S. PATENT DOCUMENTS

| | | | |
|---|---|---|---|
| 330,549 | 11/1885 | Beard et al. | 137/430 |
| 385,387 | 7/1888 | Thompson | 137/433 |
| 490,878 | 1/1893 | Marchand | 137/433 |
| 610,862 | 9/1898 | Helling | 137/192 |
| 747,514 | 12/1903 | Tozier | 137/433 |
| 847,762 | 3/1907 | Gooch | 137/433 |
| 942,368 | 12/1909 | Dyer | 137/192 |
| 1,035,663 | 8/1912 | Utley | 137/442 |
| 1,182,873 | 5/1916 | Fisher | 137/433 |
| 1,223,190 | 4/1917 | Manning et al. | 137/202 |
| 1,285,769 | 11/1918 | Melcher | 137/625.3 |
| 1,313,029 | 8/1919 | Storr | 137/422 |
| 1,555,851 | 10/1925 | Van Emon | 137/625.3 |
| 1,633,581 | 6/1927 | Gordon et al. | 137/433 |
| 1,851,348 | 3/1932 | Cooper | 137/429 |
| 1,906,277 | 5/1933 | McGee | 137/433 |
| 2,019,193 | 10/1935 | Mueller | 251/77 |
| 2,043,074 | 6/1936 | Simpson | 137/196 |
| 2,069,364 | 2/1937 | Gussick | 251/77 |
| 2,192,200 | 3/1940 | Page | 417/128 |
| 2,521,891 | 9/1950 | Beams | 251/77 |
| 2,648,347 | 8/1953 | Fahnoe | 137/196 |
| 2,726,675 | 12/1955 | Bohler | 251/77 |
| 2,926,685 | 3/1960 | Schmaus | 251/77 |
| 2,970,603 | 2/1961 | Maeda | 137/194 |
| 2,993,348 | 7/1961 | Boyle | 62/217 |
| 3,012,583 | 12/1961 | Gorgens et al. | 137/625.34 |
| 3,025,872 | 3/1962 | McLerran et al. | 137/433 |
| 3,096,390 | 7/1963 | Deniau | 174/11 |
| 3,280,589 | 10/1966 | Papapanu | 62/218 |
| 3,633,610 | 1/1972 | Hellqvist | 137/398 |
| 5,388,613 | 2/1995 | Kruger | 137/625.34 |

FOREIGN PATENT DOCUMENTS

| | | | |
|---|---|---|---|
| 618231 | 3/1927 | France | 137/430 |

*Primary Examiner*—George L. Walton
*Attorney, Agent, or Firm*—Speckman Pauley Petersen & Fejer

[57] ABSTRACT

A float valve having a pair of valve plugs mounted on a single valve stem employing a flexible or pivoting couple between the float and the valve stem that allows the float to tilt and move laterally with respect to the axis of movement of the valve stem without affecting the alignment of the valve plugs in relation to their respective valve outlets. This flexible couple might also allow for some free movement of the float in the direction of the axis of movement of the valve stem. In one embodiment the valve plugs have ported sealing surfaces that allow gradual starting and stopping of the flow of fluid through the valve outlets.

9 Claims, 3 Drawing Sheets

FLOAT VALVE

FIELD OF THE INVENTION

The present invention relates generally to valves and pertains, more specifically, to a float valve having a flexible connection between a float and a pair of ported valve plugs.

BACKGROUND OF THE INVENTION

A float valve is a passive or automatic control device that may be used to control the flow of fluid or to separate fluids or gases from lighter fluids or gases. For example, float valves have been used in two stage absorption chilling systems to control the flow of liquid from a high temperature generator. The float valve insures that the high temperature generator is always full of liquid but will not allow liquid in the high pressure generator to back up into a low pressure generator attached to the inlet of the high temperature generator. Among other uses, float valves have also been used for separating oil from gas or for separating water condensation from steam in steam heating systems and the like.

One type of float valve known in the art, such as that disclosed in U.S. Pat. No. 1,182,873, employs a pair of valve plugs mounted, one above the other, on a single valve stem. The plugs seal a pair of valve seats at the outlet of the valve. A difference between the pressure at the inlet and the outlet of the float valve will urge one valve plug up and out of its valve seat while urging the other valve plug down and into its valve seat. Because the valve plugs are mounted on the same valve stem and because the urging forces on the valve plugs are equal and opposite, the pressure difference will have a minimal influence on the action of the valve. The valve stem is rigidly attached to a float that rises when the liquid level inside the valve reaches a certain level, thereby forcing the valve stem upward and the valve plugs out of engagement with the valve seats. This allows liquid to flow out of the valve until the liquid level recedes enough to allow the valve to close.

Because the entire opening force must be provided by the float, it is important to prevent the valve plugs from frictionally engaging the valve seats. Such frictional engagement causes irregular operation of the valve and may prevent the valve from opening or closing altogether. This problem is common in known float valves because lateral movement, tilting, or manufactured misalignment of the float, which is rigidly attached to the valve stem, causes lateral movement, tilting, or misalignment of the valve stem thereby forcing the valve plugs laterally against their respective valve seats. This in turn causes frictional engagement with the valve seats.

Another common problem in known float valves is vibration and noise caused when the fluid flow through the outlets is abruptly started or stopped. Due to the rigid connection between the float and the valve stem, any bobbing action of the float can cause the valve plugs to move rapidly in an out of engagement with the valve seats at the outlets.

The problem of abrupt starting and stopping of the flow of fluid through the outlets is further aggravated by the shape of the valve plugs. Known float valves employ valve plugs having smooth sealing surfaces which create substantially a complete seal upon engagement with the valve seats. Therefore, when engagement and disengagement of the valve plugs with their valve seats is rapid, the starting and stopping of fluid flow is abrupt.

OBJECTS OF THE INVENTION

It is therefore an object of the present invention to provide a valve that allows steady and reliable, passive control of fluid flow.

A further object of the present invention is to provide a float valve wherein operation of the valve is not influenced by a difference between pressure at the inlet of the valve and the outlet of the valve.

A further object of the present invention is to provide a float valve wherein tilting, lateral movement, or manufactured misalignment of the float will not cause irregular operation of the valve.

A further object of the present invention is to provide a float valve that operates smoothly and quietly without vibration or noise.

A further object of the present invention is to provide a float valve that is reliable and is not prone to lock in an open or closed position.

A further object of the present invention is to provide a float valve that is relatively easy and economical to manufacture.

These and other objects and advantages will become apparent from the description that follows.

SUMMARY OF THE INVENTION

In accordance with the present invention, a float valve is set forth that employs a flexible or pivoting couple between the float and the valve stem. This allows the float to tilt and move laterally with respect to the axis of movement of the valve stem without affecting the alignment of the valve plugs in relation to their respective valve outlets. This flexible couple may also allow for some free movement of the float in the direction of the axis of movement of the valve stem. In one embodiment the valve plugs have ported sealing surfaces which will allow gradual starting and stopping of the flow of fluid through the valve outlets.

BRIEF DESCRIPTION OF DRAWINGS

The preferred embodiment is shown in the accompanying drawings in which.

DESCRIPTION OF THE PREFERRED EMBODIMENT

Figure 1:
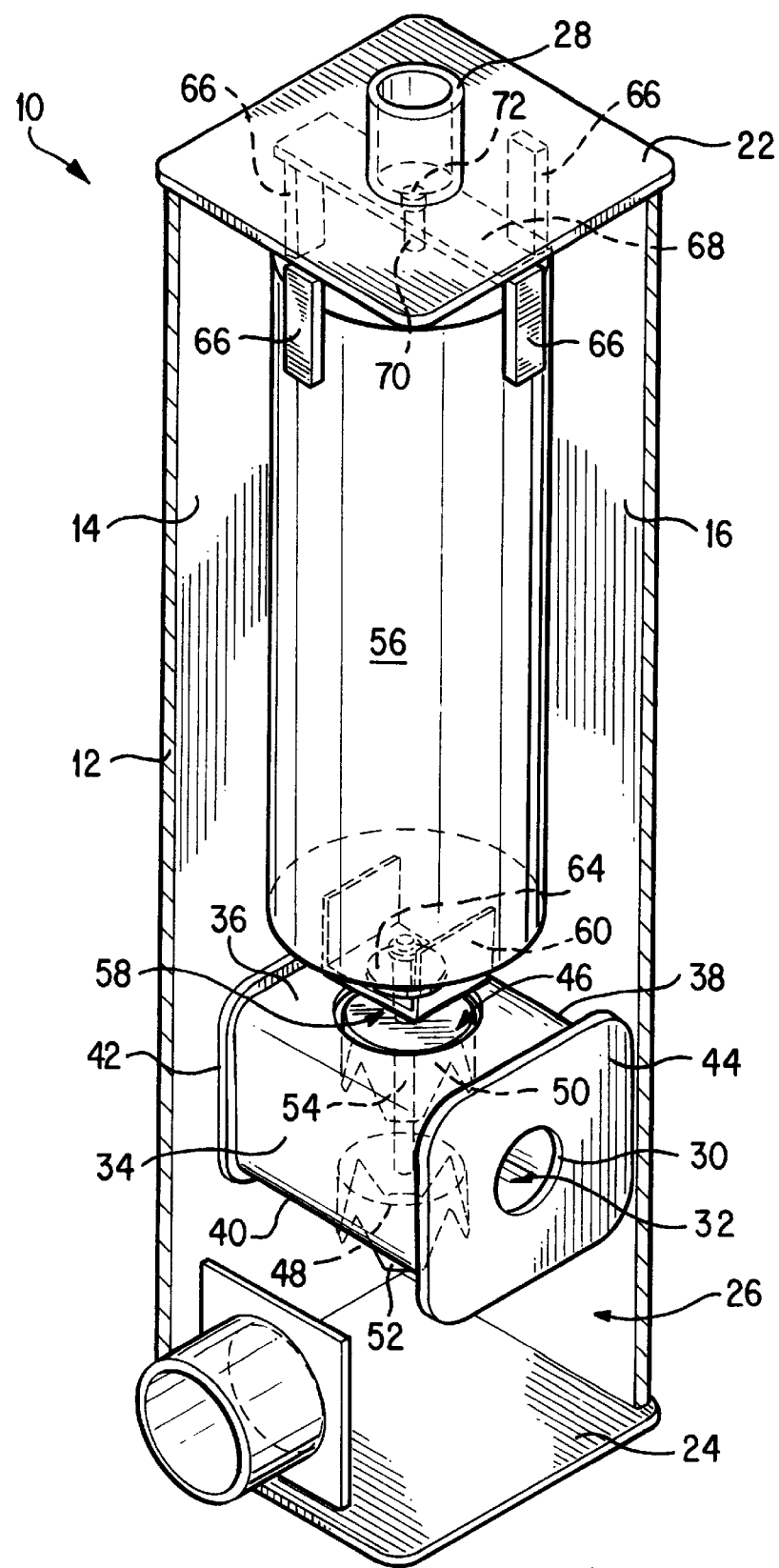
FIG. 1 is a perspective sectional view of a float valve in accordance with the present invention.

FIG. 1 illustrates a float valve 10 having an vertically elongated rectangular valve housing 12. The valve housing 12 has four elongated rectangular side walls 14, 16, 18, and 20 (side walls 18 and 20 are not shown in FIG. 1) and square upper and lower walls, 22 and 24 respectively, that form a first inner chamber 26. The upper wall 22 has a cylindrical inlet 28 that allows fluid to flow into the first inner chamber 26 of the housing 12. A circular outer opening 30 in side wall 18 (not shown), that allows fluid to exit the housing 12, is separated from the first inner chamber 26 by a second inner chamber 32.

The second inner chamber 32 is a horizontally elongated rectangle with two elongated rectangular side walls 34 and 38, an elongated rectangular upper wall 36, an elongated rectangular lower wall 40, a first square end wall 42, and a second square end wall 44. The second end wall 44 is attached to side wall 18 (not shown) and the outer opening 30 extends through the second end wall 44 to allow fluid communication between the second inner chamber 32 and the outside of the valve housing 12. The second inner chamber 32 extends from side wall 18 (not shown) across the first inner chamber 26 towards side wall 14 but does not reach side wall 14. This allows fluid to flow around the second inner chamber 32, between side wall 14 and end wall 42, into the lower portion of the first inner chamber 26. Similarly, fluid can flow around the second inner chamber 32 between side walls 34 and 38 (of the inner chamber 32) and side walls 16 and 20 (of the valve housing 12).

A pair of circular valve seats or outlets 46 and 48 are formed in upper wall 36 and lower wall 40, respectively, of the second inner chamber 32. The outlets 46 and 48 allow fluid communication between the first inner chamber 26 and the second inner chamber 32 of the valve housing 12.

A pair of cylindrical valve plugs 50 and 52 having substantially the same diameter are coaxially mounted on a single valve stem 54. The valve plugs 50 and 52 are adapted to seal their respective outlets 46 and 48 when in a lower or closed position. When the valve plugs 50 and 52 are in a closed position, fluid present in the first inner chamber 26 cannot escape through outlets 46 and 48 into the second inner chamber 32 and out through the outer opening 30.

The valve stem 54 is connected to a hollow cylindrical float 56 by a flexible couple, generally indicated at 58. This flexible or pivoting couple 58 between the float 56 and the valve stem 54 permits movement of the float 56 within a predetermined limit, either axially, conically, laterally, or some combination thereof, as is appreciated from the drawings and from the more detailed description of the couple 58 below. In one embodiment the flexible couple 58 includes a U-shaped bracket 60 connected to the bottom of the float 56. The bracket has a circular aperture 62 (not shown) through which the upper end of the valve stem 54 extends. A stop member or circular washer 64 secured about the valve stem 54 prevents the valve stem 54 from sliding completely out of the aperture 62. The flexible couple 58 and valve plugs 50 and 52 are described in greater detail below with respect to FIGS. 4 and 5.

Figure 2:
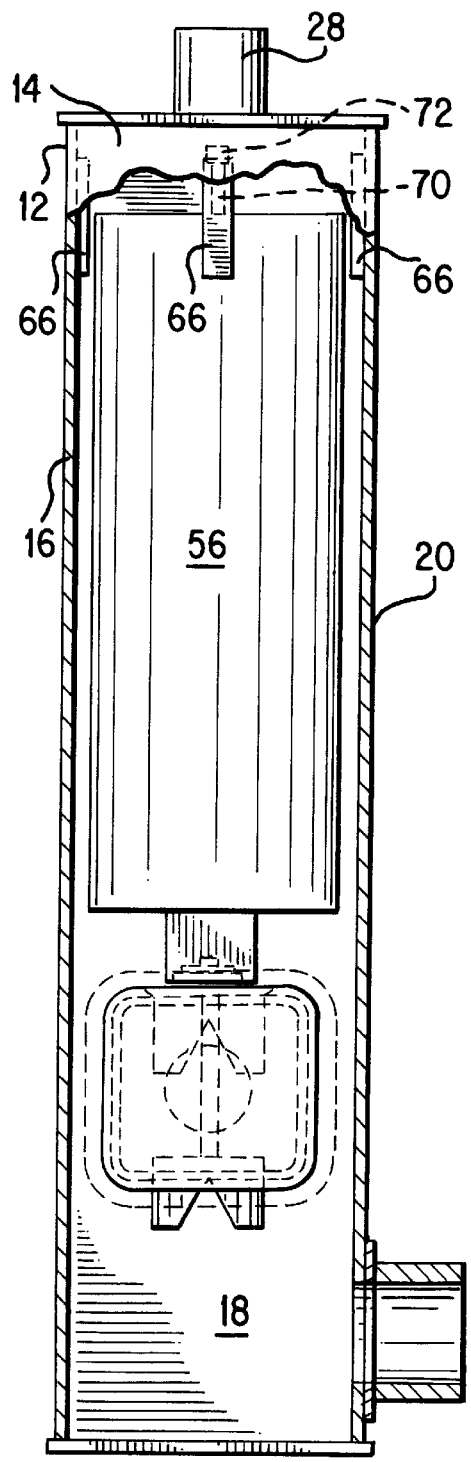
FIG. 2 is a side sectional view of the float valve of FIG. 1.
Figure 3:
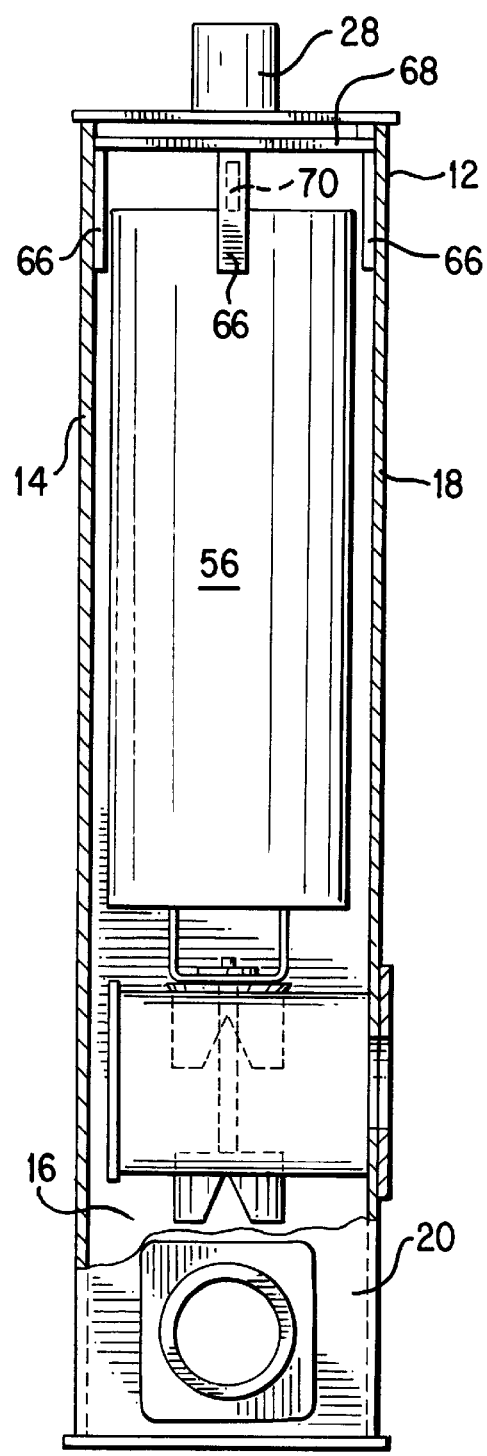
FIG. 3 is a side sectional view of the float valve of FIG. 1.

FIGS. 2 and 3 are sectional side views of the float valve 10. As can be seen, the float 56 is sized to allow some spacing between itself and the side walls 14, 16, 18 and 20 of the valve housing 12. Four rectangular float guides, all indicated at 66, are mounted on the inner surfaces of the side walls 14, 16, 18, and 20 to prevent the float 56 from touching and frictionally engaging the side walls 14, 16, 18 and 20. A rectangular cross bar 68 is connected to side walls 14 and 18 and spans the upper portion of the first inner chamber 26 of the valve housing 12 above the float 56 to prevent the float 56 from rising too far and sealing the inlet 28. The cross bar 68 also prevents the float 56 from lifting the valve plugs 50 and 52 completely out of their respective outlets 46 and 48. A cylindrical peg 70 mounted on the top of the float 56 slides through an aperture 72 in the cross bar 68 to provide additional restriction of lateral movement of the float 56.

Figure 5:
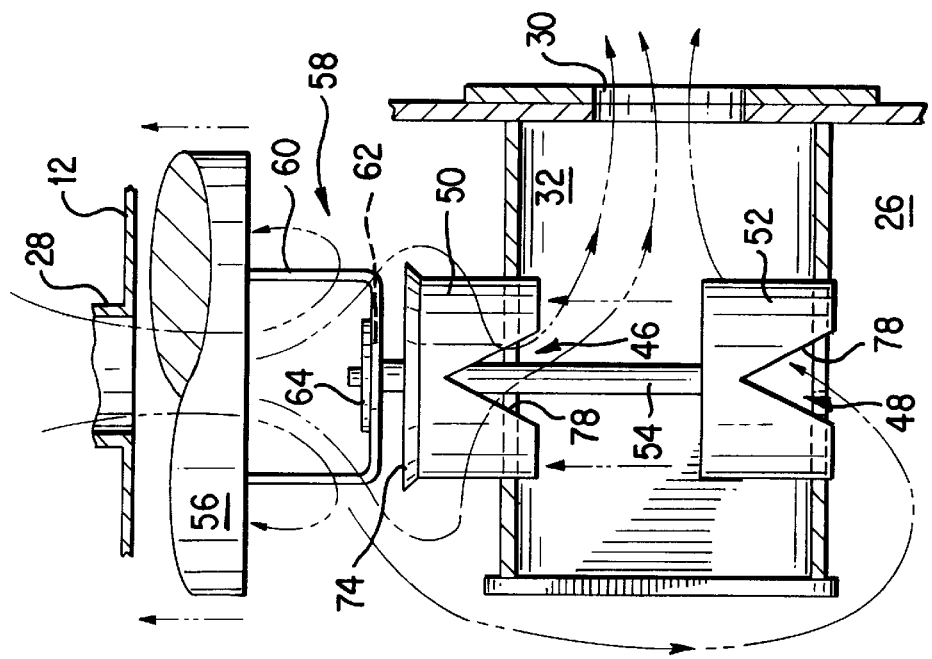
FIG. 5 is a partial blown up sectional view of the float valve of FIG. 1 in an open position.
Figure 4:
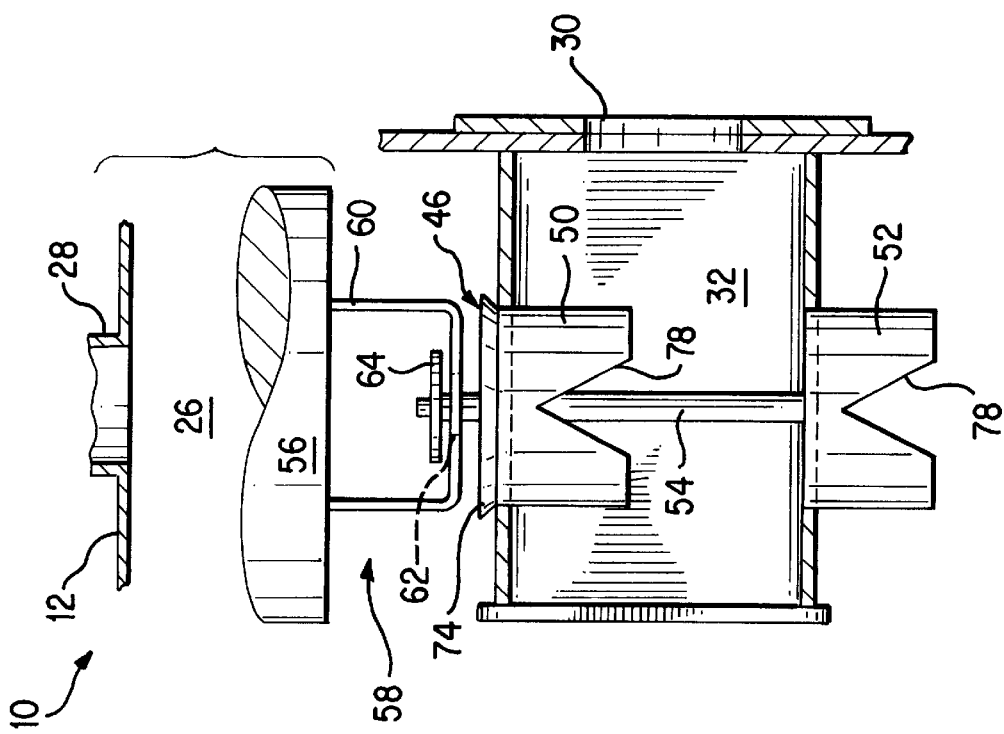
FIG. 4 is a partial blown up sectional view of the float valve of FIG. 1 in a closed position.

FIGS. 4 and 5 illustrate the opening and closing operation of the float valve 10. In FIG. 4 the valve plugs 50 and 52 are in their down or closed position. In this position fluid is prevented from flowing from the first inner chamber 26 through the outlets 46 and 48 and into the second inner chamber 32. The valve plugs 50 and 52 fit into the outlets 46 and 48 with minimal tolerance to maintain a proper seal. As can be seen, the upper plug 50 has an extended rim 74 protruding from the top of its outer surface. The rim 74 prevents the valve plugs 50 and 52 from falling all the way through their respective outlets 46 and 48. The lower valve plug 52 does not have a rim. The absence of a rim on the lower valve plug 52 allows the lower valve plug 52 to slide through the upper outlet 46 during assembly.

The flexible couple, generally indicated at 58, provides for some degree of independent movement of the float 56 with respect to the valve stem 54. The bracket 60 can move a short distance downward (without corresponding movement of the valve stem 54) to rest on the upper plug 50 or upward until the washer 64 engages the bracket 60. Additionally, the circular aperture 62 in the bracket 60 has a larger diameter than the valve stem 54 which allows the bracket 60 to move laterally or tilt with respect to the valve stem 54. Thus, as described and as further shown by the drawings, axial movement of the couple 58 within a predetermined limit is facilitated because the bracket 60 can move downward without corresponding movement of the valve stem 54, within the constraints dictated by the design parameters of the spacing therebetween. Likewise, because the circular aperture 62 in the bracket 60 has a larger diameter than the valve stem 54, the bracket 60 (and thus the couple 58) can move laterally, effecting a departure from concentricity of the circular aperture 62 with respect to the valve stem 54. This movement permits lateral movement of the couple 58 within a predetermined limit. Furthermore, the couple 58 permits tilting of the float 56 in a conical direction about the valve stem 54. This movement, too, is constrained within a predetermined limit, by location of the float guides 66.

FIG. 5 shows the valve plugs 50 and 52 in their upper or open position. As fluid flows into the valve housing 12 through the inlet 28, the fluid level in the first inner chamber 26 rises. When the fluid level reaches a certain point the float 56 becomes buoyant and moves upward until the bracket 60 engages the washer 64 causing the valve stem 54 and therefore the valve plugs 50 and 52 to move upward. As the valve plugs 50 and 52 rise upward out of their respective outlets 46 and 48, fluid will begin to flow from the first inner chamber 26 of the housing 12 through a number of triangular-shaped ports 78 in the valve plugs 50 and 52, through the outlets 46 and 48, and into the second inner chamber 32. From the second inner chamber 32, the fluid can flow out of the valve housing 12 via the opening 30. Each valve plug 50 and 52 has four equally sized ports 78 equally spaced about their lower side surfaces. The triangular shape of the ports 78 allows the flow through the outlets 46 and 48 to gradually increase and decrease as the valve plugs 50 and 52 are raised and lowered. As the flow through the outlets 46 and 48 continues, the fluid level in the valve housing 12 will decrease and the float 56 will fall until the valve plugs 50 and 52 once again seal the outlets 46 and 48.

The float valve components are preferably made of a corrosion resistant material such as stainless steel.

This invention has been described above with reference to a preferred embodiment. Modifications and alterations may become apparent to one skilled in the art upon reading and understanding this specification. It is intended to include all such modifications and alterations within the scope of the appended claims.

I claim:

1. A valve comprising:
    a valve body having an inlet, a first outlet and a second outlet;

a first valve plug and a second valve plug adapted to seal the first and second outlets, the valve plugs being mounted on a valve stem;

a float disposed within the valve body and guided therein by guide alignment means; and a freely moveable coupling member for connecting the float to the valve stem movably mounted with respect to the valve stem and being contiguous with at least one of said valve plugs in all positions of said valve plus, said freely moveable coupling member is constructed and arranged to permit movement of the float valve within a predetermined limit when said float engages at least one end of said float guide alignment means in at least one of said valve positions.

2. A valve as claimed in claim 1 wherein the first and second valve plugs have at least one port.

3. A valve as claimed in claim 2 wherein the ports in the first and second valve plugs are substantially triangular in shape.

4. A valve as claimed in claim 1 wherein the first valve plug and the second valve plug act in substantially a same direction along substantially a same axis of movement.

5. A valve as claimed in claim 4 wherein the axis of movement is substantially vertical.

6. A valve as claimed in claim 1 wherein the couple comprises a bracket mounted to the float, the bracket having an aperture through which the valve stem extends, the valve stem having a stop member near its end.

7. The valve as claimed in claim 6 wherein the stop member comprises a washer secured about the valve stem.

8. The valve as claimed in claim 6 wherein the aperture has a first diameter and the valve stem has a second diameter less than the first diameter.

9. The valve as claimed in claim 1 wherein a plurality of float guides are mounted inside the valve body for maintaining proper alignment of the float.

\* \* \* \* \*